(12) United States Patent
Wang et al.

(10) Patent No.: US 11,549,268 B2
(45) Date of Patent: *Jan. 10, 2023

(54) THERMAL INSULATION PROPERTIES OF POLYISO FOAMS

(71) Applicant: JOHNS MANVILLE, Denver, CO (US)

(72) Inventors: Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/062,347

(22) Filed: Oct. 2, 2020

(65) Prior Publication Data

US 2021/0017768 A1    Jan. 21, 2021

Related U.S. Application Data

(62) Division of application No. 15/472,411, filed on Mar. 29, 2017, now Pat. No. 10,829,939.

(51) Int. Cl.
*E04B 1/80* (2006.01)
*E04D 13/16* (2006.01)

(52) U.S. Cl.
CPC ..... *E04D 13/1662* (2013.01); *C08J 2203/182* (2013.01); *E04B 1/80* (2013.01)

(58) Field of Classification Search
CPC .............................. C08J 2203/182; E04B 1/80
See application file for complete search history.

(56) References Cited

U.S. PATENT DOCUMENTS

| 8,142,903 | B2 * | 3/2012 | Letts | E04C 2/246 |
| | | | | 428/536 |
| 9,523,195 | B2 ‡ | 12/2016 | Nandi | C08J 9/141 |
| 9,528,269 | B2 * | 12/2016 | Nandi | E04C 2/44 |
| 10,428,170 | B1 * | 10/2019 | Singh | C08G 18/06 |
| 2002/0022674 | A1 ‡ | 2/2002 | Singh | C07C 265/14 |
| | | | | 521/131 |

(Continued)

OTHER PUBLICATIONS

BSC Information Sheet 502 "Understanding the Temperature Dependence of R-Values for Polyisocyanurate Roof Insulation" (Year: 2010).*

(Continued)

*Primary Examiner* — Andrew J Triggs
(74) *Attorney, Agent, or Firm* — Robert D. Touslee

(57) ABSTRACT

Embodiments may include an insulated structure. The insulated structure may include a plurality of structural support members coupled together to form a frame. The insulated structure may also include a plurality of first wall boards attached to an exterior side of the frame to form an exterior wall or surface of the structure. The insulated structure may further include a spray foam insulation positioned within at least one of the wall cavities of the structure. The spray foam insulation may have an insulative R-value greater than or equal to 6.0 per inch at 40° F. The spray foam formulation may be made from a formulation that includes a reaction product of a polyisocyanate compound and a polyol compound and a blowing agent. The blowing agent may include a mixture of n-pentane and isopentane, where the mixture is at least 75% isopentane.

22 Claims, 7 Drawing Sheets

(56) References Cited

U.S. PATENT DOCUMENTS

2016/0017127 A1‡ 1/2016 Snider ................ C08G 18/4027
 52/232
2021/0017768 A1* 1/2021 Wang .................... E04D 13/165

OTHER PUBLICATIONS

Schumacher, C.J. et al., Development of a New Hot Box Apparatus to Measure Building Enclosure Thermal Performance, Proceedings of Buildings XII, 2013, American Society of Heating, Refrigeration, and Air Conditioning Engineers (ASHRAE).‡

Singh, Sachchida N. et al., Optimizing Polyiso Blowing Agents, Huntsman Advanced Technology Center, The Woodlands, Texas.‡

\* cited by examiner
‡ imported from a related application

THERMAL INSULATION PROPERTIES OF POLYISO FOAMS

CROSS-REFERENCE TO RELATED APPLICATIONS

This application is a division of pending U.S. application Ser. No. 15/472,411 filed Mar. 29, 2017. The entire contents of the above-identified application are herein incorporated by reference for all purposes.

BACKGROUND

Polyisocyanurate foam (i.e., PIR board stock) has been widely used to insulate roofs and walls of commercial and industrial buildings for many decades due to its excellent thermal insulation, flame resistance, and mechanical properties. The insulating performance and other performance of polyisocyanurate foams vary based on termperature. These foams may perform worse at lower temperatures than at higher temperatures. Better performance is often desired at lower temperatures from foams. The present application describes such formulations and their use in foam boards in roofing and wall systems for building insulation as well as other articles.

BRIEF SUMMARY

Embodiments of the present technology may improve the performance of thermal insulation at low temperatures. Polyiscocyanurate (polyiso) foam boards formed with certain blowing agents may increase the insulative R-value at lower temperatures, such as around 40° F. Certain blowing agents also may be cost effective. As a result of improved thermal insulation, wall systems and roof systems using polyiso foam boards may have improved thermal insulation performance with greater cost efficiency.

Embodiments may include an insulated structure. The insulated structure may include a plurality of structural support members coupled together to form a frame. The insulated structure may also include a plurality of first wall boards attached to an exterior side of the frame to form an exterior wall or surface of the structure. At least one of the first wall boards may include a polyiso foam board. The polyiso foam board may include a polyisocyanurate core made from a formulation that includes a reaction product of a polyisocyanate compound and a polyol compound and a blowing agent. The blowing agent may include a mixture of n-pentane and isopentane, where the mixture is at least 75% isopentane by weight. The polyisocyanurate core may have an insulative R-value greater than or equal to 6.0 per inch at 40° F.

Embodiments may also include a method of insulating a component of a building. The method may include coupling a plurality of structural support members together to form a frame. The method may also include attaching a plurality of first boards to an exterior side of the frame to form an exterior wall or surface of the structure. The method may further include attaching a plurality of second boards to an interior side of the frame to form an interior wall or surface of the structure. The structural support members, the first boards, and the second boards may define a plurality of wall cavities. At least one of the plurality of first boards includes a polyiso foam board. The foam board may include a polyisocyanurate core made from a formulation that includes a reaction product of a polyisocyanate compound and a polyol compound, and a blowing agent comprising a mixture of n-pentane and isopentane, wherein the mixture is at least 75% isopentane by weight. The polyisocyanurate core may have an insulative R-value greater than or equal to 6.0 per inch at 40° F.

Embodiments may include a foam board. The foam board may include a polyisocyanuarte core produced from an isocyanate, a polyol, and a blowing agent. The blowing agent may include a mixture of n-pentane and isopentane, with the mixture at least 75% isopentane. The polyisocyanurate core may have an insulative R-value greater than or equal to 6.0 per inch at 40° F.

Embodiments may also include a wall system. The wall system may include a plurality of structural support members coupled together to form a frame. The wall system may also include a plurality of polyisocyanurate insulation foam boards positioned on an exterior side of the frame to form an exterior wall or surface of the wall system. The polyisocyanurate insulation foam boards may further include a polyisocyanurate core. The polyisocyanurate core may have an isocyanate index greater than or equal to 250 and an insulative R-value of greater than equal to 6.0 at 40° F. The polyisocyanurate core may be produced from an isocyanate, a polyol, and a blowing agent. The blowing agent includes a mixture of n-pentane and isopentane, where the mixture is at least 75% isopentane. The wall system may also include a plurality of wall boards attached to an interior side of the frame to form an interior wall or surface of the wall system. The structural support members, the polyisocyanurate insulation foam boards, and the wall boards may define a plurality of wall cavities. The wall system may further include an insulation material that is positioned within at least one of the wall cavities of the structure.

Embodiments may include a roof system. The roof system may include a structural deck positioned atop joists or other support members of the roof system. The roof system may also include a plurality of polyisocyanurate foam insulation boards positioned atop the structural deck to form an insulation layer for the roof system. The roof system may also include a water proof membrane positioned atop the plurality of polyisocyanurate foam insulation boards to form a water proof layer for the roof system. Each polyisocyanurate foam insulation board may include a polyisocyanurate core produced from an isocyanate, a polyol, and a blowing agent. The blowing agent may include a mixture of n-pentane and isopentane, where the mixture is at least 75% isopentane. Each polyisocyanurate core may have an insulative R-value greater than or equal to 6.0 per inch at 40° F.

Embodiments may also include a method of forming a roof system. The method may include positioning a structural deck atop joists or other support members of the roof system. The method may also include positioning a plurality of polyisocyanurate foam insulation boards atop the structural deck to form an insulation layer for the roof system. The method may further include positioning a water proof membrane atop the plurality of polyisocyanurate foam insulation boards to form a water proof layer for the roof system. Each polyisocyanurate foam insulation board may include a polyisocyanurate core produced from an isocyanate; a polyol; and a blowing agent. The blowing agent may include a mixture of n-pentane and isopentane, where the mixture is at least 75% isopentane. The polyisocyanurate core may have an insulative R-value greater than or equal to 6.0 per inch at 40° F.

BRIEF DESCRIPTION OF THE DRAWINGS

The present invention is described in conjunction with the appended figures.

Figure 1:
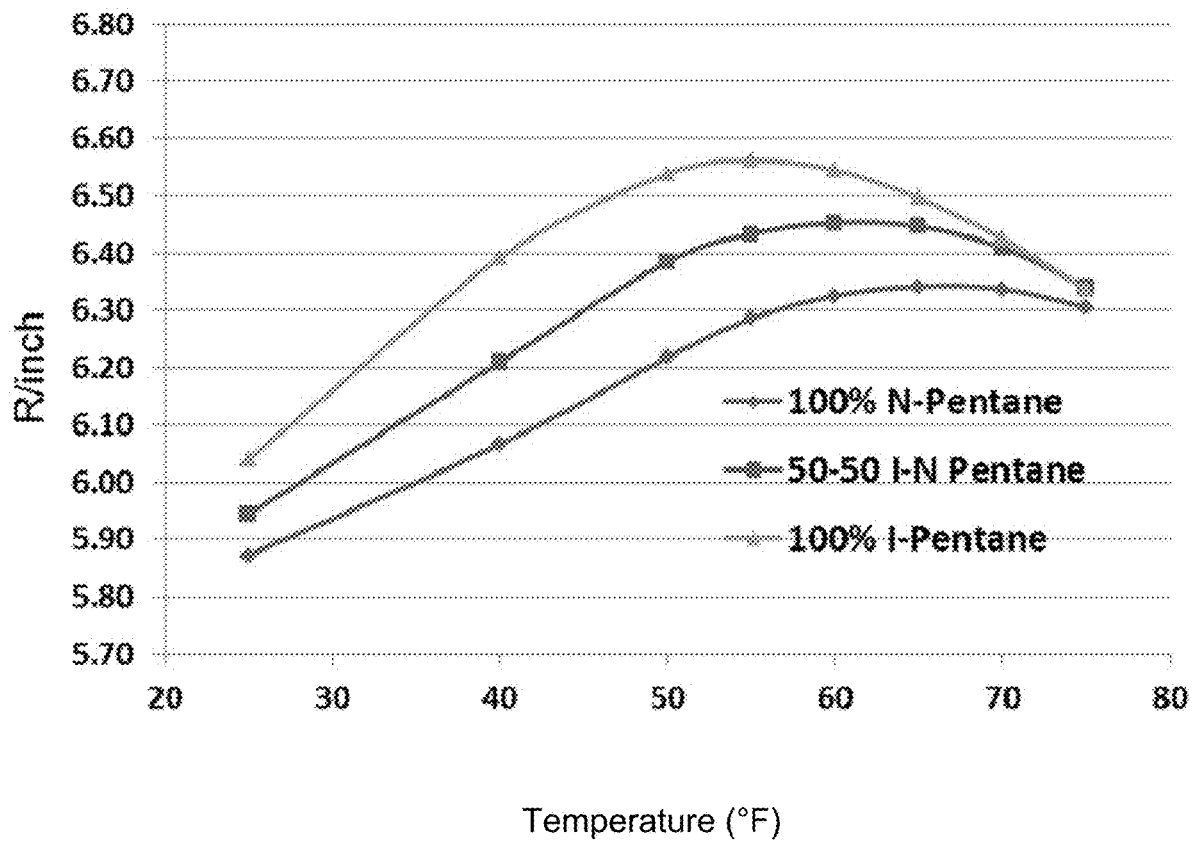
FIG. 1 shows a graph of insulative properties at different temperatures of foams formed with different blowing agents according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Conventional polyisocyanurate foam boards may include closed-cell polyisocyanurate (polyiso) foam insulation. The polyiso foam insulations may be formed with blowing agents that result in adequate R-values at 75° F. mean temperature, which is the temperature reported for insulation ratings (e.g., ASTM 1289). R-value is a measure of thermal resistance. R-values are often considered to have a linear relationship with temperature, with a lower temperature associated with a higher R-value (e.g., Schumacher et al., "Development of a new hot box apparatus to measure building enclosure thermal performance," *Proceedings of Buildings XII* (2013)). However, R-values often vary with temperature in different ways. R-values may decrease at lower temperatures. Polyiso foam insulations may not be designed for lower temperatures, including around 40° F. R-values at lower temperatures may be more relevant because insulation may be used at these temperatures more often than at higher temperatures. Existing insulations that may have higher R-values at lower temperatures may be expensive and not economically viable for many applications, including for wall systems and roof systems.

The thermal insulation value of close-cell polyiso foam may depend on the thermal conductivity of cell gas, polymer matrix, and radiation thermal transfer. The thermal properties of insulating materials may exhibit inflection points in thermal properties. For example, the thermal resistance versus mean temperature may show an inflection point as a result of a phase change of the insulating gases in the foam. The inflection point may also depend on the foam formulation and the blowing agent. The inflection point may be related to the composition, boiling point, vapor pressure, and other properties of the blowing agent.

Conventional polyiso foams may be produced with blowing agents that are a mix of approximately equal parts of n-pentane and isopentane (i.e., 2-methylbutane). Conventional polyiso foams may have an inflection point between 50° F. to 70° F., which results in lower thermal resistance (i.e., lower R-values) at lower temperatures, such as at or below 40° F.

Embodiments of the present technology include polyiso foams formed using blowing agents with much more isopentane than n-pentane, which was unexpectedly found to have improved performance at lower temperatures including around 40° F. For example, the ratio of isopentane to n-pentane may be greater than or equal to 70:30, including greater than or equal to 75:25, 80:20, 85:15, 90:10, 91:9, 92:8, 93:7, 94:6, 95:5, 96:4, 97:3, 98:2, or 99:1 in embodiments. In some embodiments, the ratio of isopentane to n-pentane may be a range from any ratio mentioned to any other ratio mentioned. In some embodiments, the blowing agent may include isopentane without n-pentane. The blowing agents with higher isopentane percentages may have an inflection point lower than 50° F. to 70° F. The performance of the foam at lower temperatures, including the R-value at 40° F., was an unexpected property, particularly when performance at higher temperatures (e.g., R-value at 75° F.) may be about the same for different ratios of isopentane to n-pentane. The R-value at 40° F. for foams with blowing agents with much more isopentane than n-pentane is also superior compared to conventional foams.

FIG. 1 shows the R-value at different temperatures for a polyiso foam produced with different blowing agents. The blowing agents included 100% n-pentane, 100% isopentane, and a 50%/50% mixture of isopentane and n-pentane. The R-value at 75° F. are all approximately equal. However, at lower temperatures, the R-values for the different blowing agents diverge. For example, at 40° F., 100% n-pentane has the lowest R-value and 100% isopentane has the highest R-value, with the 50%/50% mixture in between. The 100% isopentane blowing agent also has an R-value at 40° F. that is unexpectedly higher than the R-value at 75° F. Foams with blowing agents with high isopentane ratios may then have higher R-values than conventional foams, and high isopentane ratios may also result in R-values at temperatures lower than 75° F. being higher than the R-value at 75° F. The R-value may be measured with a heat flow meter. The foam may be placed between a hot plate and a cold plate. R-value at 40° F. denotes the mean temperature at 40° F. between the hot plate and the cold plate. The R-value may be measured when the heat flow reaches an equilibrium state.

Without intending to be bound by theory, it is hypothesized that the lower boiling point, higher partial vapor pressure, and lower condensation temperature of isopentane than n-pentane leads to lower condensation and improves the thermal resistance at lower temperatures. In closed cell foams, blowing agents may be trapped in the cells. At lower temperatures, blowing agents may partially or fully condense. Isopentane may stay in gaseous form and may not fully condense when the temperature decreases. Gases generally have higher thermal resistance than liquids, and as a result, if isopentane remains in gaseous form in the closed cells of polyiso foam, the polyiso foam insulation may have a higher thermal resistance.

N-pentane may be included to provide better compatibility with polyols and B-side formulations. N-pentane may reduce the amount of emulsifiers or stabilizers in the formulation. Blowing agents may also include cyclopentane or in other embodiments, blowing agents may exclude cyclopentane.

Polyiso foams produced with the blowing agents may have a PIR/PUR ratio greater than or equal to 2.0, including at least 2.5 or at least 3.0 in embodiments. The polyiso foam may have be a closed cell foam insulation. The polyiso foam may have a cell size of 200 μm or less, including 150 μm or less or 100 μm or less. The density of the foam may be up to 10 pcf, including from about 1.8 pcf to about 4.0 pcf, from about 2.0 pcf to about 4.0 pcf, from about 4.0 pcf to about 6.0 pcf, from about 6.0 pcf to about 8.0 pcf, or from about 8.0 pcf to about 10 pcf. The blowing agent may be from 1 to 10 weight percent of the polyiso foam, including from about 1 to about 2 weight percent, from about 2 to about 3 weight percent, from about 3 to about 4 weight percent, from about 4 to about 5 weight percent, from about 5 to about 6 weight percent, from about 6 to about 7 weight percent, from about 7 to about 8 weight percent, from about 8 to about 9 weight percent, from about 9 to about 10 weight percent, or any combination of these ranges.

In embodiments, wall systems and roof systems with polyiso foam may also have improved insulation performance and have lower costs. Foams and structures may be similar to those described in U.S. Ser. Nos. 14/750,397, 14/299,571, 14/299,631, and 14/299,605 the contents of which are incorporated herein by reference for all purposes.

Exemplary Foam Boards

Polyiso foams may be made by combining separate liquid mixtures that include the polyisocyanates (the A-side mixture) and the polyols (the B-side mixture). The A-side mixture and B-side mixture mix together to form the polyiso foam product.

While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of a isocyanurate ring from the trimerization of three generic diisocyanate molecules:

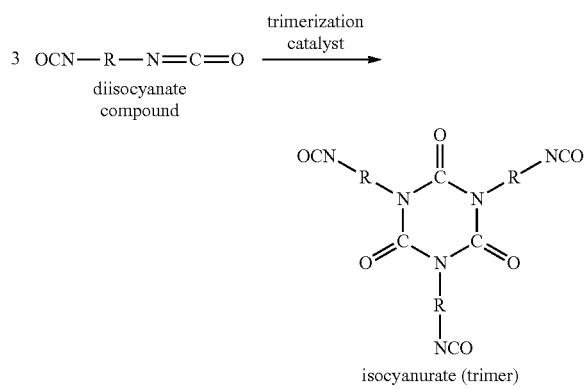

The polyisocyanate reactants (e.g., diisocyanate reactants) still leave active isocyanate groups on the isocyanurate ring after trimerization which can react with additional polyisocyanurate reactants and the polyol reactants. The isocyanurate rings react with the polyols to form a cross-linked polyisocyanurate polymer. When the polyisocyanurate polymer is formed with the help of a blowing agent, it forms a PIR foam. The presence of the isocyanurate rings in the molecular structure of a PIR foam normally impart greater stiffness and higher resistance to chemical and thermal breakdown compared with polyurethane foams.

Because a distinguishing characteristic of the PIR formation is the trimerization of the isocyanate reactant to form isocyanurate rings, PIR formulations generally have a larger molar portion of the polyisocyante to polyol, and include polyisocyanate trimerization catalysts. In many instances, the polyols used in the formulations are also different.

The A-side mixture may include one or more polyisocyanate compounds. Exemplary polyisocyanates may include substituted or unsubstituted polyisocyanates, and may more specifically include aromatic, aliphatic, and cycloaliphatic polyisocyanates having at least two isocyanate functional groups. Specific exemplary aromatic polyisocyanates include 4,4'-diphenylmethane diisocyanate (MDI), polymeric MDI (PMDI), toluene disisocyanate, and allophanate modified isocyanate. A commercial example of a PMDI that may be used in the present formulations is Rubinate® M manufactured by Huntsman Polyurethanes of The Woodlands, TX. This PMDI has a viscosity range of about 200 to about 300 cps at 25° C. (e.g., 190 cps at 25° C.), a functionality range of about 2.3 to about 3.0, and an isocyanate content that ranges from about 28% and about 35% (e.g., 31%).

The B-side mixture of the polyiso foam may include one or more polyol compounds. The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

Exemplary polyols may include polyether polyols, polyester polyols, aromatic polyols (including polyester polyols, PET-based polyols, and polyamide-based polyols), and mannich polyols. Polyether polyols may be made by polymerizing one or more types of epoxides, such as ethylene oxide or propylene oxide. The may also be made by polymerizing the epoxide with a polyol such as a diol (e.g., glycol), triol (e.g., glycerin), or other polyol. Exemplary polyether polyols may include polyether diols such as polyether polyethylene glycol, polypropylene glycol, and poly(tetramethylene ether) glycol, among other polyether diols. Additional exemplary polyether polyols that may be used in the present formulations are sold under the tradename Jeffol® by Huntsman Polyurethanes of The Woodlands, Tex.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Stepan Company under the name Stepanol® and those sold by Huntsman Corporation under the name of Terol®. Exemplary polyester polyols may have a functionality between 2 and 2.8 and hydroxyl number between 150 mg KOH/gm and 450 mg KOH/gm. The polyols used may be only polyester polyols and may exclude other polyols.

Mannich polyols may be made by the alkoxylation of mannich bases with, for example, propylene oxide and/or ethylene oxide. Additional exemplary mannich polyols that may be used in the present formulations are sold under the tradename Jeffol® (e.g., Jeffol® R-350X, R-425X, and R-470X) by Huntsman Polyurethanes of The Woodlands, Tex.

Catalysts used in polyisocyanurate foam formulations normally include trimerization catalysts that catalyze the formation of cyclic isocyanurate trimers from the polyisocyanate reactant. Exemplary trimerization catalysts include tertiary amines, such as pentamethyldiethylenetriamine (PMDETA), dimethylcyclohexylamine, and 1, 3, 5-tris(3-(dimethylamino)propyl)-hexahydro-triazine. Exemplary catalysts may also include metal catalysts, such as potassium octoate and potassium acetate, and quaternary ammonium salts such as Polycat® TMR sold by Air Products and Chemicals, Inc.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, and Tergostab® series surfactants from Evonik, such as Tergostab® 8535.

The present polyisocyanurate formulations may also include the non-halogenated and/or halogenated fire retardants. In some embodiments, these non-halogenated fire retardants reduce the amount of halogenated fire retardants such as TCPP use in the foams. The halogenated fire retardant may include tris(2-chloroisopropyl)phosphate (TCPP). The polyisocyanurate core may be able to form a sufficiently stable char when exposed to flame conditions in accordance with ASTM E-84. The stable char enables the polyisocyanurate core to pass the ASTM E-84 test. The polyisocyanurate foam insulation boards may exhibit an ASTM E1354-11 b performance that is equivalent with or better than a similar polyisocyanurate foam insulation board having a halogenated fire retardant tris(2-chloroisopropyl) phosphate (TCPP) or without a non-halogenated fire retardant.

The phosphorus containing non-halogenated fire retardant may include: an organo-phosphate, an organo-phosphite, and/or an organo-phosphonate. The non-halogenated organa phosphorus fire retardant could be non-reactive or reactive, i.e. containing isocyanate reactive functionality. An exemplary non-reactive organa phosphorus fire retardant is a blend of butyl diphenyl phosphate, dibutyl phenyl phosphate, and triphenyl phosphate. An exemplary reactive organa phosphorus fire retardant is diethyl hydroxylmethyl phosphonate (DEHMP). In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

Select embodiments of the present polyisocyanurate formulations may further include one or more of initiators and carbohydrates. Unlike catalysts, an initiator is consumed during the polymerization reaction and becomes part of the polyiso foam product. Exemplary initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others. A carbohydrate may include a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all.

The blowing agents used to make the foam may include hydrocarbon gas (e.g., n-pentane, isopentane, cyclo-pentane, etc.) and/or fluorocarbon gas, among others. The blowing agent may include a mixture of isopentane and n-pentane, as previously described. Specific examples of fluorocarbon gases may include HFC-245fa (i.e., 1,1,1,3,3-pentafluoropropane) commercially available under the tradename Enovate® from Honeywell Corp., HFC-365mfc (i.e., $CF_3CH_2CF_2CH_3$), HFC-134a (i.e., 1,1,1,2-tetrafluoroethane), HCFO 1233zd (i.e., trans-1-chloro-3,3,3-trifluoropropene) sold under tradname Solstice® LBA by Honeywell Corp. and Forane® 1233zd by Arkema. The blowing agent may be in the B-side mixture.

The B-side mixture may also include an emulsifier.

An exemplary formulation for a polyiso spray foam insulation may have an isocyanate index greater than about 250, including from 250 to 270 and from 270 to 350. When a polyisocyanate reacts with a polyol to form a urethane bond, one NCO group reacts with one OH group. As is known in the art, the index is defined as the ratio of NCO group to OH group multiplied by 100 as shown in the formula below:

$$\text{Index} = \frac{\text{Moles of NCO group}}{\text{Moles of OH group}} \times 100$$

When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 250 and 270, provides at least a 2:1 ratio of NCO groups to OH groups, which has been found to provide an appreciable combination of structure integrity, thermal strength and/or stability, and fire resistance.

Figure 2:
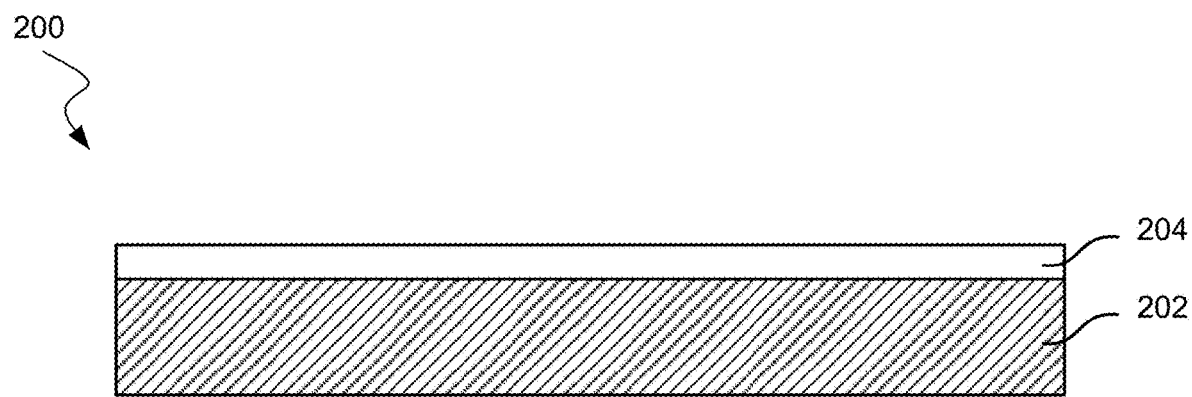
FIG. 2 illustrates an embodiment of a polyisocyanurate foam board.

Referring now to FIG. 2, illustrated is an embodiment of a polyisocyanurate foam board 200 (hereinafter foam board 200). The foam board 200 includes a polyisocyanurate core 202 that is produced from an isocyanate, a polyol, and a blowing agent mixture of isopentane and n-pentane.

The polyisocyanurate core 202 typically has an average foam cell size of less than about 200 microns, and more commonly between about 100-150. In contrast, conventional foam boards typically have an average foam cell size of between about 200 and 300. The smaller foam cell size of the polyisocyanurate core 202 may enable the core to exhibit an increased R-value when compared with conventional cores.

In some embodiments, the polyisocyanurate core 202 may include between 1 and 10 weight percent of a hydrocarbon blowing agent, such as any blowing agent described herein. In an exemplary embodiment, the polyisocyanurate core 202 may include between 5 and 8 weight percent of the hydrocarbon blowing agent. The weight percent of the hydrocarbon blowing agent typically corresponds with the foam density of the polyisocyanurate core 202 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot (lbs/ft$^3$), commonly have 5% or more of a hydrocarbon blowing agent by weight, and more commonly between about 6 and 7 weight percent. In contrast, roofing cover boards that have a density of up to 10 lbs/ft$^3$, and more commonly between about 6 and 7 lbs/ft$^3$, commonly have less than 5% of a hydrocarbon blowing agent by weight, and more commonly between about 1.5 and 3 weight percent.

The foam insulation board may have different densities. For example, a lower density foam insulation board may have a density of between about 1.5 and 2.5 lbs/ft$^3$, including between about 1.6 and 1.8 lbs/ft$^3$). A higher density foam cover board may have a foam density of up to 10 lbs/ft$^3$, including between about 6 and 7 lbs/ft$^3$).

Foam board 200 also includes a facer material 204 that is applied to at least one surface of the polyisocyanurate core 202. The facer material 204 typically includes a glass fiber mat, but may include other types of facer materials. The facer material 204 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 204 may include a mineral and/or pigment based coating with high solid content to provide one or more desired characteristics, such as low porosity, fire retardancy, mechanical strength, and the like. The facer 204 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 204 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 204 may have a thickness of between about 0.006 and 1.2 mm. The thickness of 0.006 mm typically represents the thickness of a metal facer while the 1.2 mm represents the thickness of other facers.

Although FIG. 2 shows the facer 204 being positioned on a single side of the polyisocyanurate core 202, it should be realized that in many embodiments an additional facer may be positioned on the opposite side of the polyisocyanurate core 202. The additional facer may be a similar or different facer than facer 204 and/or may have a different thickness and/or material coating as desired.

The polyisocyanurate core 202 may have an initial R-value at 40° F. of at least 6.30, and commonly between 6.5 and 6.55. This initial R-value is higher than that initially exhibited by conventional polyisocyanurate cores.

The polyisocyanurate foam board 200 commonly has a density of between about 1.45 and 10 lbs/ft$^3$, and more commonly between 1.5 and 7.5 lbs/ft$^3$. In an exemplary embodiment, a polyisocyanurate foam cover board may have a density of between about 4 and 8 lbs/ft$^3$, and more commonly between about 6 and 7 lbs/ft$^3$; a polyisocyanurate foam insulation roofing board may have a density of between about 1.5 and 2.0 lbs/ft$^3$, and more commonly between about 1.6 and 1.7 lbs/ft$^3$; and a polyisocyanurate foam sheathing board may have a density of between about 1.5 and 2.5 lbs/ft$^3$, and more commonly between about 1.6 and 2.0 lbs/ft$^3$.

Figure 3:
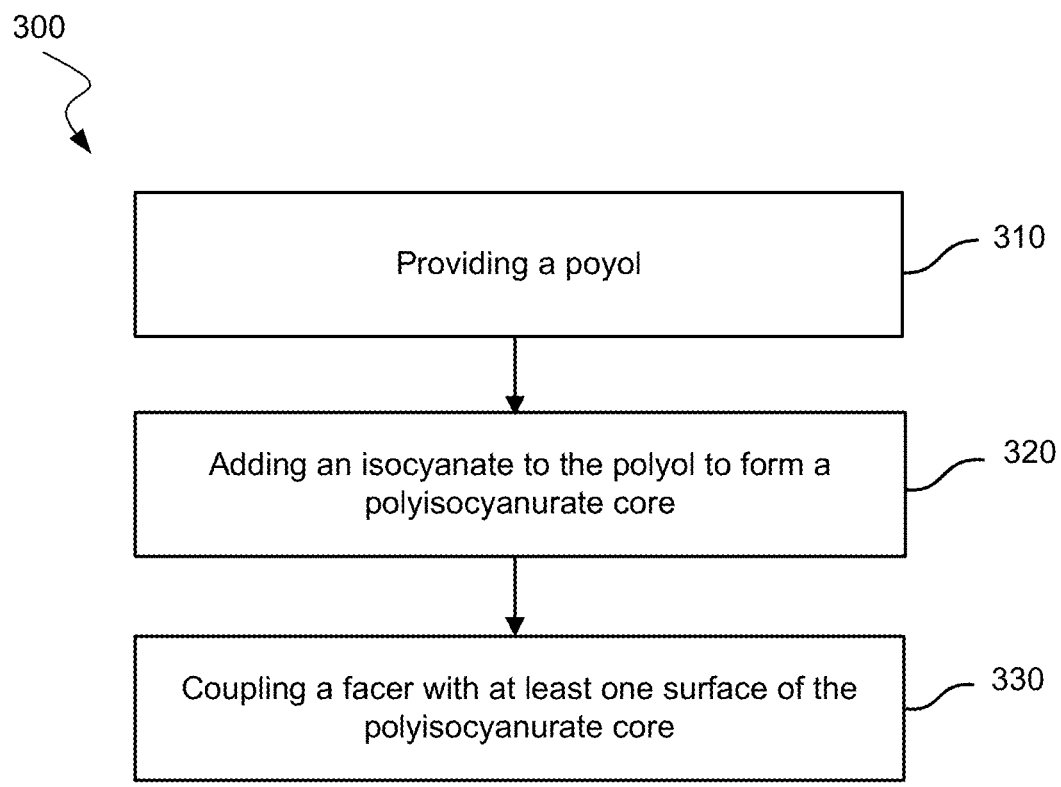
FIG. 3 illustrates a method of forming a polyisocyanurate foam board according to embodiments of the present technology.

Referring now to FIG. 3, illustrated is a method of forming a polyisocyanurate foam board. At block 310, a polyol is provided. At block 320, an isocyanate is added to the polyol to form a polyisocyanurate core having an isocyanate index greater than about 200. A fire retardant may be added the polyisocyanurate core. At block 330, a facer material is coupled with at least one surface of the polyisocyanurate core. The facer material includes a glass fiber mat, or other mat, that may be selected based on the end application of the polyisocyanurate foam board as described herein. In some embodiments, an additional facer material may be coupled with an opposite surface of the polyisocyanurate core.

The resulting polyisocyanurate core may have an R-value as described herein. In some embodiments, the method may also include adding between 1 and 10 weight percent of a hydrocarbon blowing agent to the polyisocyanurate core.

Exemplary Wall Systems or Insulated Structures

Wall structures or systems of commercial and residential structures are commonly insulated by filling a wall cavity that is positioned between wall studs (wood or metal). The wall cavity may be filled using a spray foam insulation, Batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 4:
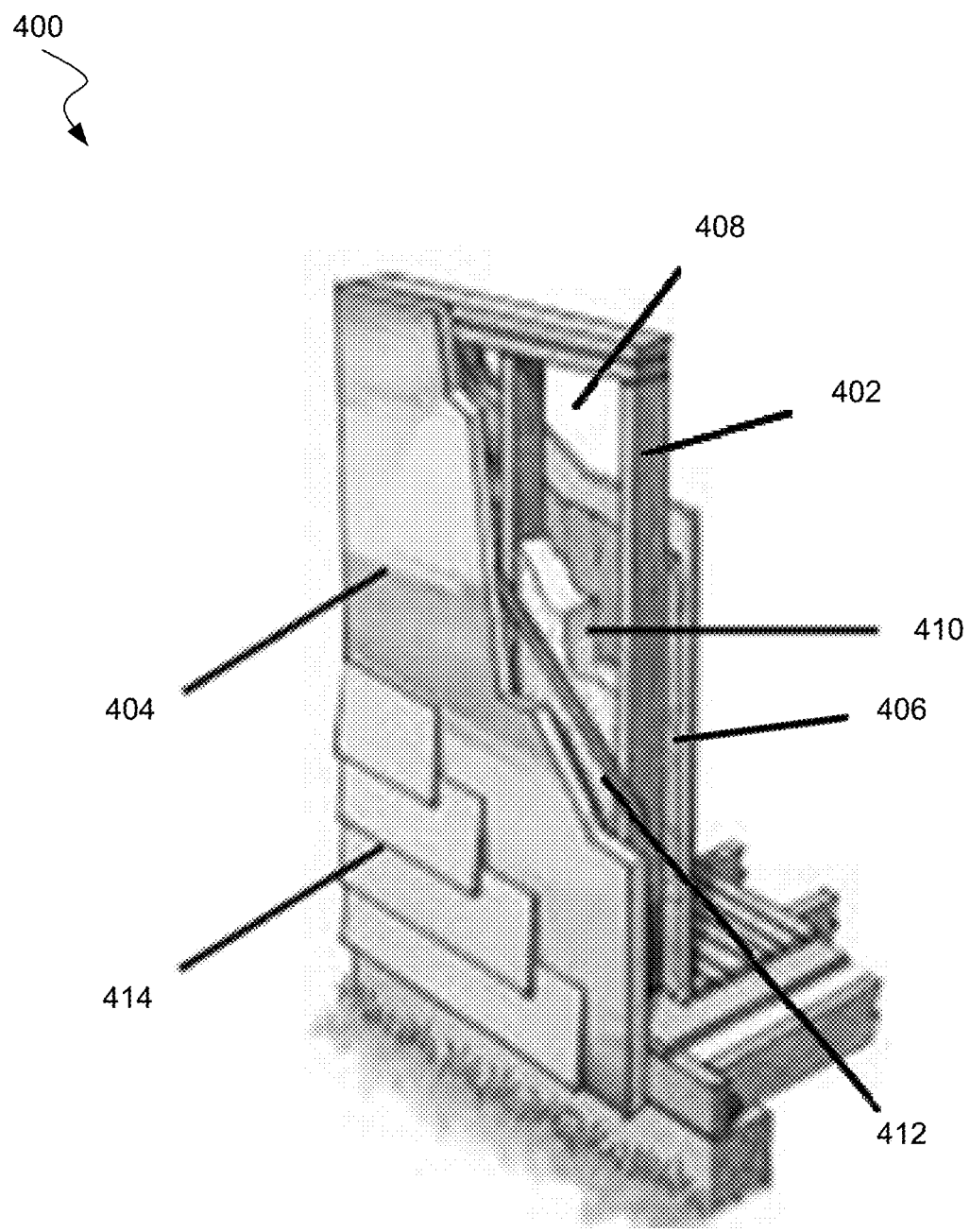
FIG. 4 illustrates an embodiment of a wall system or structure that may be used to insulate a commercial or residential structure.

Referring now to FIG. 4, illustrated is an embodiment of a wall system or structure 400 that may be used to insulate a commercial or residential structure. Wall system 400 includes a plurality of structural support members or wall studs 402 that are coupled together to form a wall frame. A plurality of foam boards 404 (hereinafter sheathing boards 404) are attached to an exterior side of the frame to form an insulative exterior wall or surface of the wall system 400 (i.e., continuous external sheathing insulation). A plurality of wall boards 406 are attached to an interior side of the frame opposite the sheathing boards 404 to form an interior wall or surface of the wall system 400. Exemplary wall boards 406 include gypsum boards and the like. The wall studs 402, sheathing boards 404, and wall boards 406 define a plurality of wall cavities 408.

Fasteners (not shown) are used to attach the sheathing boards 404 and wall boards 406 to the respective sides of the frame. Each fastener may include an elongate shaft that penetrates through a respective board and into a wall stud 402 to couple the components together. Exemplary fasteners include nails and screws, although in some embodiments non-mechanical fasteners may be used, such as adhesives and the like. An insulation material 410 is positioned within at least one of the wall cavities 408 of the wall system, and more commonly within each wall cavity 408 or within most of the wall cavities. The insulation material 410 is positioned within the wall cavity 408 to insulate the building or structure. As described herein, exemplary insulation materials include spray foam insulation (open cell and/or close cell), Batt or roll insulation (e.g., fiberglass, mineral wool, cotton, and the like), loose fill insulation (e.g., fiberglass, cellulose, mineral wool, and the like), or a combination thereof. The spray foam insulation may be any spray foam insulation described herein.

In some embodiments, an additional wall board 412 may be attached to the exterior side of the frame. In some embodiments, the additional wall board 412 may be free of a halogenated fire retardant. The additional wall board 412 may be a gypsum board, cement board, oriented strand board (OSB), plywood, and the like. Wall board 412 may be positioned between the sheathing board 404 and frame or wall studs 402 for structural support and/or other purposes. External veneer or cladding 414 (hereinafter exterior cladding 414) may be positioned on an exterior side of the sheathing boards 404. In some embodiments, the exterior cladding 414 may be free of a halogenated fire retardant. The exterior cladding 414 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 414 and the sheathing boards 404. The wall system 400 may also include other components, layers, and/or materials that are not shown, such as an interior vapor barrier, flashing, primer, and the like.

As described herein, the sheathing board 404 of wall system 400 include a polyisocyanurate core that is produced from: an isocyanate, a polyol, and a blowing agent comprising a mixture of isopentane and n-pentane, with greater than or equal to 75% isopentane. The polyisocyanurate core has an isocyanate index of greater than or equal to 250. The polyisocyanurate core may be any core described herein.

In some embodiments, the sheathing board 404 may also include a foil facer that is attached to an exterior side of the board. The sheathing boards 404 may have a foam density of between about 1.5 and 2.5 lbs/ft$^3$, and more commonly between about 1.6 and 2.0 lbs/ft$^3$. In some embodiments, the polyisocyanurate core also include between 1 and 10 weight percent of a hydrocarbon blowing agent. The sheathing board more commonly include between about 5 and 8 weight percent of the hydrocarbon blowing agent. The sheathing board may be any foam board described herein.

Figure 5:
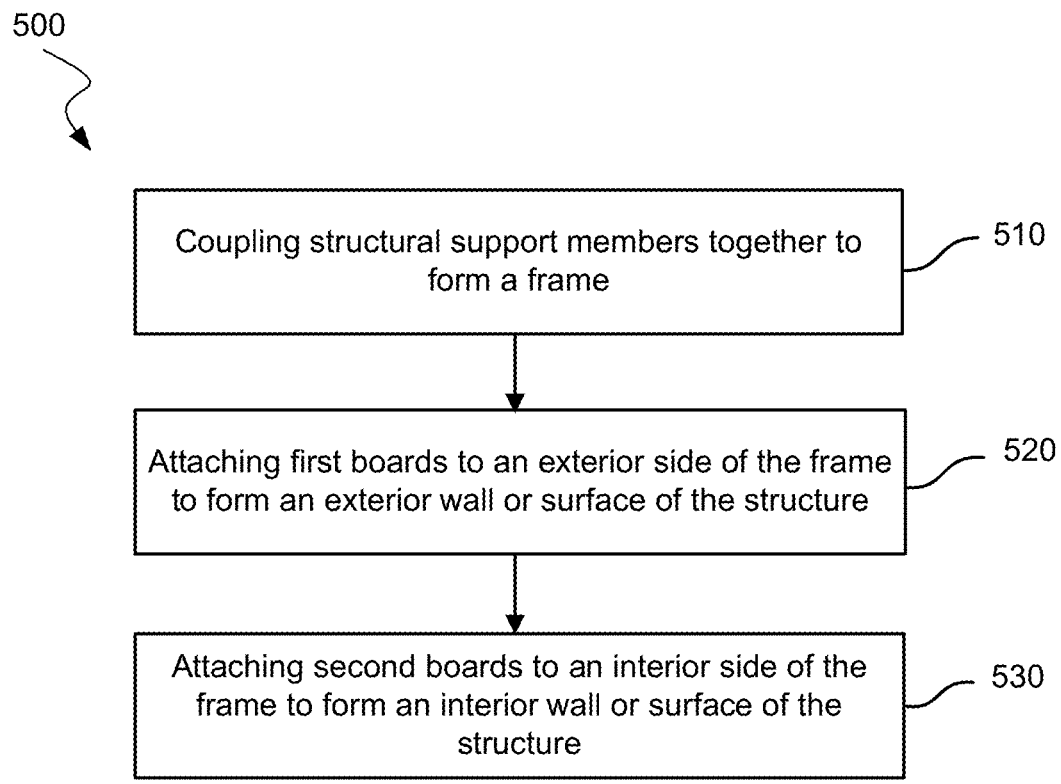
FIG. 5 illustrates a method of forming a wall of a structure according to embodiments of the present technology.

Referring now to FIG. 5, illustrates is a method of forming a wall of a structure. At block 510, a plurality of structural support members(i.e., wall studs) are coupled together to form a frame. At block 520, a plurality of first boards (i.e., foam boards or polyisocyanurate sheathing boards) are attached to an exterior side of the frame to form an insulative exterior wall or surface. At block 530, a plurality of second boards (i.e., wall boards) are attached to an interior side of the frame to form an interior wall or surface. The structural support members, foam boards, and wall boards are coupled together to define a plurality of wall cavities. An insulation material (e.g., a spray foam material, a fiberglass material, or a combination thereof) may be positioned within at least one of the wall cavities, and commonly most or all wall cavities, to insulate an interior space of the structure.

As described herein, at least one of the foam boards includes a polyisocyanurate core that is produced from an isocyanate, a polyol, and a blowing agent mixture of isopentane and n-pentane in the described ratios.

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core.

Wall systems may include those described in U.S. application Ser. No. 13/299,571, which is incorporated herein by reference for all purposes.

Exemplary Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 6:
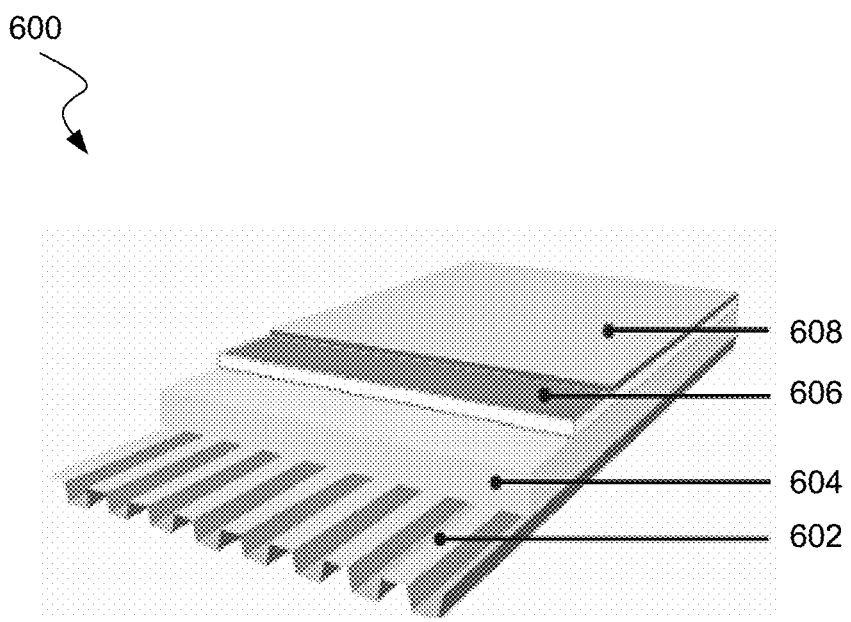
FIG. 6 illustrates a roof deck or system that may be used for a commercial or industrial structure according to embodiments of the present technology.

Referring now to FIG. 6, a construction of a commercial roof deck (i.e., roof system 600) is shown. Roof system 600 includes a structural deck 602, which is commonly made of steel or galvanized metal (18 to 22 gauge), although other types of materials and/or sizes are possible. The structural deck 602 is commonly positioned above steel, metal, or other joists and supported thereby. A plurality of foam insulation boards 604 (hereinafter insulation boards 604) are positioned atop the structural deck 602 to form an insulative layer of roofing system 600. As described herein, the insulation boards 604 are polyisocyanurate foam boards having an isocyanate index greater than 250. The foam board may be any foam board described herein.

In some embodiments, a plurality of cover boards 606 are positioned atop the insulation boards 604 to add a protective layer to roofing system 600. The covers board 606 may be added for fire and/or mechanical protection (e.g., hail or impact resistance) or for various other reasons. In embodiments, the cover boards 606 may include perlite based boards, gypsum based boards, and the like. In some embodiments, the roofing system 600 does not include cover boards 606.

A water proof membrane 608 is positioned atop the roofing system 600. The water proof membrane 608 may be positioned atop the cover boards 606, insulation boards 604, and/or another component/layer of the roofing system 600. In some embodiments, the water proof membrane 608 may include a built-up roof, modified bitumen, thermoplastic olefin (TPO), ethylene propylene diene monomer (EPDM), metal, and the like. The water proof membrane 608 may be ballasted, adhered, mechanically fastened, and the like atop the roofing system 600 to couple the water proof membrane 608 with the roofing system's components/layers. Further, individual components of the water proof membrane 608 may be coupled together to form the water proof membrane 608. For example, individual TPO segments, sheets, or strips may be heat welded together to form a substantially continuous TPO layer atop the roofing system 600. Similarly, individual EPDM segments may be adhered or bonded together and metal segments may be mechanically fastened or bonded to form a substantially continuous water proof membrane layer.

The roofing system 600 may be slightly sloped to promote drainage of water and/or for various other reasons as desired. The roof system 600 may also include other components, layers, and/or materials that are not shown, such as bonding cement, primer, acoustic infills, and the like.

As described herein, the insulation boards 604 and/or cover boards 606 are polyisocyanurate foam boards that include a polyisocyanurate core. The polyisocyanurate core is produced from an isocyanate, a polyol, and a blowing agent mixture of isopentane and n-pentane. The polyisocyanurate core has an isocyanate index of greater than 250. The polyisocyanurate core may be any core described herein.

In some embodiments, the insulation boards 604 also includes a facer that is coupled with one or more surfaces of the insulation board 604, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 604 may have a foam density of between about 1.5 and 2.0 lbs/ft$^3$, and more commonly between about 1.6 and 1.7 lbs/ft$^3$. In some embodiments, the insulation board's polyisocyanurate core also includes between 1 and 10 weight percent of a hydrocarbon blowing agent. The insulation boards 604 commonly include between about 5 and 8 weight percent of the hydrocarbon blowing agent.

In some embodiments, the cover boards 606 also includes a facer that is coupled with one or more surfaces of the cover board 606, commonly both surfaces. The facer typically includes a glass fiber mat, but may include other types of facer materials. The cover board 606 may have a foam density of between about 3 and 8 lbs/ft$^3$, and more commonly between about 6 and 7 lbs/ft$^3$. In some embodiments, the cover board's polyisocyanurate core also includes between 1 and 10 weight percent of a hydrocarbon blowing agent, which may be a highly flammable material as described herein above. The cover boards 606 commonly include between about 1.5 and 3 weight percent of the hydrocarbon blowing agent.

Figure 7:
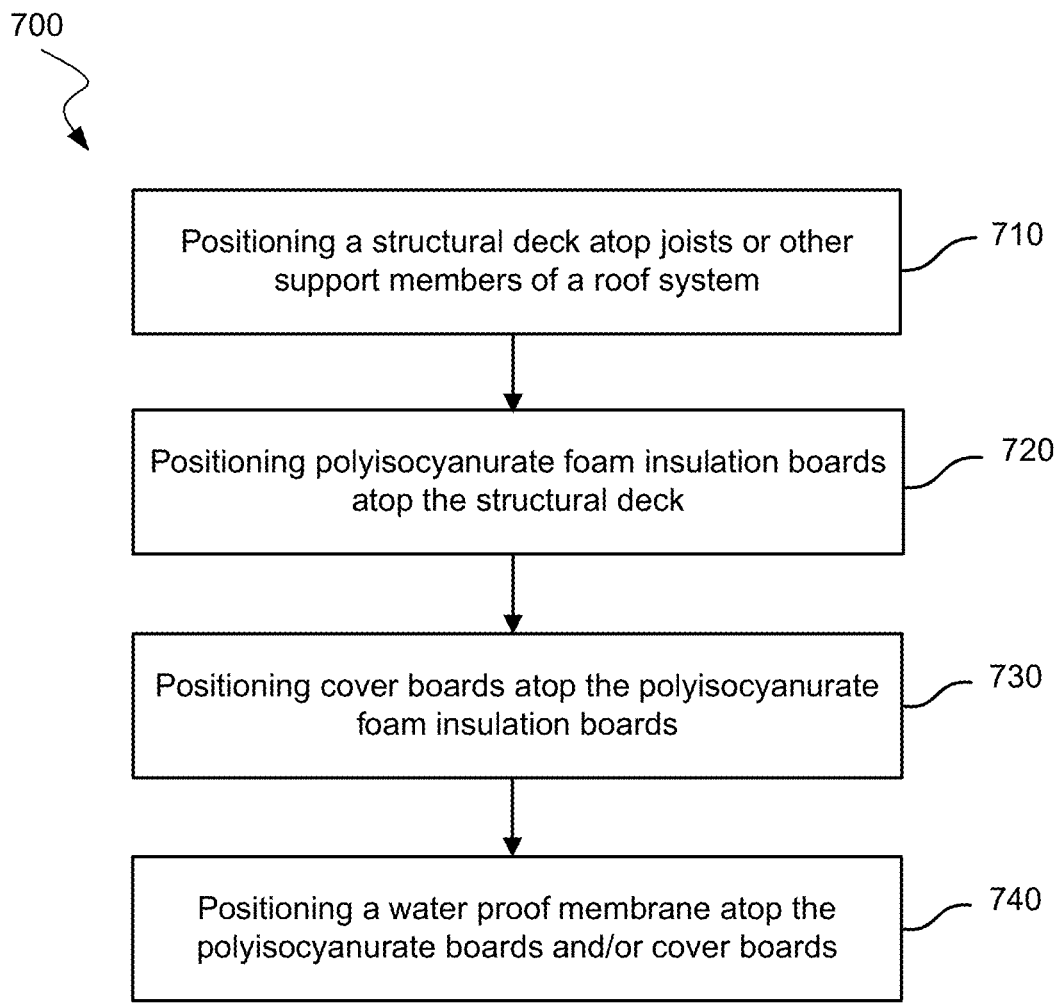
FIG. 7 illustrates a method of forming a roofing system of a structure according to embodiments of the present technology.

Referring now to FIG. 7, illustrated is a method of forming a roofing system of a structure. At block 710, a structural deck is assembled atop joists (metal and the like) or other structurally supporting members. At block 720, a plurality of foam insulation boards (i.e., polyisocyanurate foam roof insulation boards) are positioned atop the structural deck to provide an insulation layer for the roofing system. At block 730, a plurality of cover boards are optionally positioned atop the foam insulation boards to form a protective layer for the roofing system. At block 740, a water proof membrane is positioned atop the foam insulation boards and/or cover boards to provide a water proof layer for the roofing system.

As described herein, at least one of the foam insulation boards includes a polyisocyanurate core that is produced from an isocyanate, a polyol, and an isopentane/n-pentane blowing agent mixture. The polyisocyanurate core may be any polyisocyanurate core described herein.

In some embodiments, at least one of the cover boards includes a polyisocyanurate core that is produced from an isocyanate, a polyol, and an isopentane/n-pentane blowing agent mixture. In some embodiments, the method includes applying between 1 and 10 weight percent of the blowing agent to the polyisocyanurate core of the foam insulation board(s) and/or cover board(s). In some embodiments, the method further includes attaching a facer to at least one surface of the foam insulation board(s) and/or cover board (s).

Roofing systems may include those described in U.S. application Ser. No. 14/299,631, which is incorporated herein by reference for all purposes.

All patents, patent publications, patent applications, journal articles, books, technical references, and the like discussed in the instant disclosure are incorporated herein by reference in their entirety for all purposes.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the board" includes reference to one or more boards and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A foam board comprising
   a polyisocyanurate core produced from:
      an isocyanate;
      a polyol; and
      a blowing agent comprising a mixture of n-pentane and isopentane, wherein:
         the mixture is at least 50% isopentane, and
         the polyisocyanurate core has an insulative R-value greater than or equal to 6.0 per inch at 40° F., and an inflection point having an insulative R-value greater than 6.3.

2. The foam board of claim 1, further comprising a facer material applied to one surface of the polyisocyanurate core.

3. The foam board of claim 1, wherein the polyisocyanurate core has a density from 1.5 to 2.5 pcf.

4. The foam board of claim 1, wherein the polyisocyanurate core is produced from at least one of a halogenated fire retardant or a non-halogenated fire retardant.

5. The foam board of claim 1, wherein the mixture is at least 90% isopentane.

6. The foam board of claim 1, wherein the polyisocyanurate core has a PIR/PUR ratio greater than or equal to 2.0.

7. The foam board of claim 1, wherein the polyisocyanurate core is a closed cell insulation with a cell size of 200 µm or less.

8. The foam board of claim 1, wherein the polyisocyanurate core has an isocyanate index greater than or equal to 250.

9. The foam board of claim 1, wherein the polyol comprises an aromatic polyol.

10. The foam board of claim 1, wherein the polyisocyanurate core is a closed cell insulation having a density from about 2.0 to about 4.0 pcf.

11. The foam board of claim 1, wherein the blowing agent is from 1 to 10 weight percent of the polyisocyanurate core.

12. The foam board of claim 1, wherein the mixture is at least 75% isopentane.

13. The foam board of claim 1, wherein the polyisocyanurate core has an insulative R-value greater than 6.0 at a temperature less than or equal to 30° F.

14. The foam board of claim 1, wherein the polyisocyanurate core maintains an insulative R-value within 0.25 R/inch between an inflection point temperature and 40° F.

15. An insulated structure comprising:
a plurality of structural support members coupled together to form a frame; and
a plurality of first boards attached to an exterior side of the frame to form an exterior wall or surface of the insulated structure; wherein:
at least one of the plurality of first boards comprises a foam board,
the foam board includes a polyisocyanurate core produced from:
an isocyanate;
a polyol; and
a blowing agent comprising a mixture of n-pentane and isopentane, wherein:
the mixture is at least 50% isopentane by weight; and
the polyisocyanurate core has an insulative R-value greater than or equal to 6.0 per inch at 40° F., and an inflection point having an insulative R-value greater than 6.3.

16. The insulated structure of claim 15, wherein the mixture is at least 90% isopentane.

17. The insulated structure of claim 15, wherein the polyisocyanurate core has a PIR/PUR ratio greater than or equal to 2.0.

18. The insulated structure of claim 15, wherein the polyisocyanurate core is a closed cell insulation with a cell size of 200 µm or less.

19. The insulated structure of claim 15, wherein the polyisocyanurate core has an isocyanate index greater than or equal to 250.

20. A method of insulating a component of a building, comprising:
coupling a plurality of structural support members together to form a frame;
attaching a plurality of first boards to an exterior side of the frame to form an exterior wall or surface of a structure; and
attaching a plurality of second boards to an interior side of the frame to form an interior wall or surface of the structure, wherein the structural support members, the first boards, and the second boards define a plurality of wall cavities; wherein:
at least one of the plurality of first boards comprises a foam board,
the foam board includes a polyisocyanurate core produced from:
an isocyanate;
a polyol; and
a blowing agent comprising a mixture of n-pentane and isopentane, wherein:
the mixture is at least 50% isopentane by weight; and
the polyisocyanurate core has an insulative R-value greater than or equal to 6.0 per inch at 40° F., and an inflection point having an insulative R-value greater than 6.3.

21. The method of claim 20, wherein the polyisocyanurate core is a closed cell insulation with a cell size of 200 µm or less.

22. The method of claim 20, wherein the polyisocyanurate core has an isocyanate index greater than or equal to 250.

* * * * *